United States Patent Office 3,001,854
Patented Sept. 26, 1961

3,001,854
METHOD FOR PURIFYING TITANIUM
SULFATE SOLUTIONS
Lester A. Kenworthy, Baltimore, Md., assignor to The Glidden Company, Cleveland, Ohio, a corporation of Ohio
No Drawing. Filed May 18, 1959, Ser. No. 813,643
7 Claims. (Cl. 23—117)

This invention concerns a process for the manufacture of $TiO_2$ and to acid recovery therefrom. The invention relates more particularly to a process for treating solutions of sulfuric acid comprising soluble titanium values and impurities with an ion exchange resin in order to selectively remove undesired contaminating materials from said solution, to recover a purified acid from contact with said resin and, to obtain a purified acid solution suitable for hydrolysis and for recovery of titanium values from said solution in the form of metatitanic acid. This invention is a continuation-in-part of my parent application Serial No. 671,690, filed July 15, 1957, now abandoned.

In the manufacture of titanium dioxide from titanium bearing ores and slags, it is conventional to treat the crude material or mixtures thereof with sulfuric acid to obtain a digestion mass, or cake, consisting largely of acid and water-soluble sulfates of titanium, iron and other minor impurities. Exemplary of some of the usual impurities are aluminum, copper, magnesium, manganese, molybdenum, sodium, nickel, selenium, vanadium, zirconium. Major impurities are usually iron, aluminum and magnesium. Of importance are also manganese, chromium and vanadium. Most of these impurities usuallly exist in a sulfuric acid solution in a valency state less than 4, whereas titanium is present in the tetravalent form. In practice, ilmenite ore and/or titanium bearing slags are comminuted and then reacted, at elevated temperatures, with concentrated sulfuric acid in a suitable chamber to form a cake of titanium and iron sulfates, etc., preparatory to the recovery of titanium values either as salts or in the form of hydrous titanium oxide. The reaction cake resulting from the sulfuric acid attack comprises generally soluble titanium values, soluble ferrous, ferric and other metallic sulfates, unattacked ore and gangue. After the sulfuric acid attack, the reaction mixture is cooled and dissolved in aqueous media to bring into solution the soluble metallic values. In the ensuing processing, it is necessary, for various reasons, to subject the crude solution to a reducing treatment in order to convert the ferric iron to the ferrous state and generally a small amount of the titanium to the trivalent state. After this reduction treatment, the unattacked portion of the ore is removed, for example, by settling the acid solution and/or by coagulating it with glue or a metallic sulfide according to well-known procedures. The treatment facilitates the subsequent recovery of the titanium values in an uncontaminated condition from the clarified solution.

The treatment most prevalently used for the reduction of ferric iron in the crude solution is the scrap iron treatment to reduce it to the ferrous state and to reduce a small amount of the titanium to the trivalent state as a safeguard against re-oxidation to ferric iron during the succeeding steps of the process. The resulting liquor, contaminated with some unreacted ore, gangue and slime residues, is thereafter clarified by treating with a coagulant to give a stock titanium solution. Titanium sulfate solutions, as is known, can be hydrolyzed thermally, that is, by seeding and boiling, or chemically, that is, by alkali treatment. In thermal hydrolysis, a seeding agent in the form of a dispersed hydrous titanium sol is added to a clarified titanium sulfate solution and then heated to the boiling point to effect hydrolysis. The resulting precipitated titanium hydrate is filtered out, washed, dried, calcined and ground, being then ready for use as a pigment.

The filtrate from the hydrolysis step, i.e., the "waste acid," contains in excess of 10% by weight of sulfuric acid, from about 0.2 to 1% or more titanium values, up to 9% or more of iron and modest amounts of Mg, Al and other impurities.

The waste acid has heretofore been discarded, since it is difficult to recover. Recovery is generally unprofitable. Additionally, an even more serious factor in some localities is the nuisance problem, for example, the contamination or pollution of streams resulting from such waste acid disposal.

Generally, disposal problems can be divided into two categories: those which aim only at disposal of the wastes, and those in which by-product recovery is attempted. My invention is partly concerned with the latter category, since, as will be more fully illustrated hereinafter, I can substantially eliminate objectionable waste disposal problems by, in one instance, recovering and reusing sulfuric acid solutions as well as by recovering titanium values which have heretofore been led to waste with the acid.

A broad object of my invention is, accordingly, the treatment of sulfuric acid solutions comprising titanium to remove said titanium therefrom more fully as described below.

A further object of my inventoin is the treatment of sulfuric acid solutions obtained from the acid digestion of a raw ore and/or slag to obtain an acid titanium sulfate solution substantially completely free of undesired impurities.

A still further object of my invention is the treatment of waste acid solutions to recover titanium values therefrom and sulfuric acid.

Another object of my invention is the elimination of certain process steps in the production of titanium dioxide from ilmenite, slag or mixtures thereof.

Still another object of my invention is the elimination of waste disposal problems by acid recovery and to acid recovery from titaniferous ores treated with sulfuric acid.

In my parent copending application identified above, I have described a process which comprises treating a black sulfuric acid solution (more fully identified below) or a waste acid solution with a cation exchange resin in the hydrogen form and recovering from contact with said resin a solution consisting essentially only of titanium values. I have discovered that a cation exchange resin in the hydrogen form selectively removes all the metallic impurities by ion exchange but unexpectedly passes substantially all of the titanium so that an acid solution obtained as an effluent is substantially free of such undesirable metallic salts.

In treating black sulfuric acid solutions with cation exchange resins in the hydrogen form, I have also discovered that during the contact of the solutions with the resin there is obtained as an initial effluent material, solutions which consist of substantially uncontaminated free sulfuric acid. The importance of this finding will be explained below more fully. The reason for this phenomenon is not understood but this result, as well as subsequent results are readily translated into advantages which could not have been foreseen from a thorough survey of the art pertaining to cation exchange resins and processes in which they are employed. The advantages to be realized by the process of this invention as well as the embodiments of the invention in connection with said advantages will be described hereinbelow, after a discussion of the scope of the cation exchange resins applicable herein and of the solutions which can be used in the process.

Suitable cation exchange resins that are applicable in the process of my invention are those of an acid-base character such as the nuclear sulfonic, —$SO_3H$ or methylene sulfonic, —$CH_2SO_3H$, these resins being available commercially in the hydrogen form, that is, hydrogen is the exchanging cation present in the resin. These and other applicable cation exchange resins are polymeric materials containing a phenolic, sulfonic, carboxylic, phosphonic, etc., acid group as an integral portion of the resin and an equivalent amount of cations. The polymeric portion of the resin is usually cross-linked and the solubility of the resin structure is negligible. Thus, these cation exchange resins are insoluble in water, are acid-resistant, usually cross-linked, chemically stable and usually undergo a minimum of degradation during use.

A nuclear sulfonic cation exchange resin can be prepared by the sulfonation with sulfuric acid of a copolymer prepared from a mixture of styrene and divinyl benzene. Such a resin is discribed in U.S. Patent No. 2,366,007. Reference is also made to the description of the fundamental properties of such a nuclear sulfonic acid cation exchange resin in Ind. and Eng. Chem. 39, 2830 (November 1947). Additionally, Kunin and Myers, in "Ion Exchange Resins," 1950, J. Wiley and Sons, Inc., pages 54 to 57, describe the preparation of sulfonic acid cation exchange resins and carboxylic-type cation exchange resins.

Several cation exchange resins are available commercially under the following trademarks: "Dowex 50"; "Wofatit P, K and KS"; "Zeo Rex" and "Permutit H"; and "Nalcite HGR." Resort can be had to the literature for a further description of properties and the preparation of these resins.

The sulfuric acid solutions to be employed in the process of this invention and passed through a cation exchange resin in the hydrogen form for the purpose of selectively removing undesired cationic impurities can be taken from one or more steps of a titanium dioxide manufacturing plant (or equivalent sulfuric acid solutions). Thus, a sulfuric acid solution can be taken in one case from the acid attack of the raw titanium-bearing ore after dissolution of the digestion cake in aqueous media. In this instance, the settled liquor, after the bulk of suspended solids has been removed, can be treated by the cation exchange resin in accordance with my invention. It should be understood, however, that even the unsettled liquor can be used as the charge to the cation exchange resin bed if desired, although other problems may be encountered by virtue of the undissolved and/or suspended solids in the liquor or solution. By treating a settled liquor from the sulfuric acid treatment of titaniferous ores, there can be eliminated various conventional steps in the process, viz., the ferric iron reduction step and clarification operation, since by treatment with the resin, there is obtained a substantially pure solution of sulfuric acid consisting of substantially all the titanium values and which after suitable adjustment of concentration, in one instance, is made more suitable for hydrolysis for the recovery of titanium. Moreover, the mother liquors resulting from the hydrolysis of such a purified solution are also suitable for concentration and reuse. This is an important aspect of the invention since disposal, contamination and costs are reduced by this method.

The mother liquor obtained from the precipitation of hydrous $TiO_2$ from a sulfuric acid solution in a titanium dioxide manufacturing plant, is also a suitable starting liquor that can be treated according to the process of this invention. Ordinarily this liquor is contaminated with metal sulfates and does not respond to conventional methods of recovery such as evaporation followed by crystallization and filtration. Passage of this waste acid through a bed of a cation exchange resin in the hydrogen form removes metal cations directly from the strong acid solution, regenerating acid and permitting its concentration and reuse. It has been found, as heretofore indicated, that the resin removes substantially all of the contaminating metallic ions, while the bulk of the titanium present passes through the resin with the acid and is available for recovery, thereby increasing the yield of this oxide obtainable from the raw materials over prior art processes. More important here, however, is the regeneration of the acid by ion exchange, the recovery thereof, and the fact that the resin can be treated to recover the metal ions therefrom by a regeneration procedure described below. Also by virtue of the fact that substantially pure or uncontaminated free sulfuric acid can be recovered as an initial effluent from contact with the resin, even though only to the extent approximately of the combined impurity acid, diversion of such acid enhances recovery and simplifies subsequent hydrolysis of the balance of effluent. All of these manipulative steps as well as the embodiments of the invention relating to such, e.g. cycle handling versus one long column etc., will be described below.

In a preferred embodiment of this invention, an aqueous sulfuric acid solution comprising all the metallic values from the acid digestion step is contacted with a suitable quantity of a cation exchange resin in the hydrogen form at ordinary room temperatures and for one or more cycles in order to recover: substantially free sulfuric acid, and sulfuric acid solution containing substantially all titanium values originally present in the charge material free of undesired impurities and can thereafter be treated to recover the titanium and acid, and the metallic impurities on regeneration of the resin.

In an alternate embodiment of my invention, a waste acid obtained from the $TiO_2$ precipitation step in a titanium dioxide manufacturing plant is contacted with a suitable quantity of a cation exchange resin in the hydrogen form at ordinary room temperatures and for one or more cycles, to regenerate the combined acid and recover such, and separately metallic impurities on regeneration of the resin.

In either of the above aspects of my invention, the cation exchange resin regenerates sulfuric acid by the exchange of hydrogen for the metal cations, thereby resulting in the case of a waste acid, in a purified sulfuric acid solution suitable for recycling and automatic recovery of titanium values, or in the case of a pregnant black solution, of a purified titanium sulfate solutions more suitable for hydrolysis plus a modest quantity of purified sulfuric acid directly. I prefer to employ a stable water-insoluble nuclear sulfonic acid resin of high acid strength in the hydrogen form (i.e., R—$SO_3H$) adaptable for operation at high flow rates.

In theory, the underlying principle of ion exchange is concerned with equivalent exchange and for a cation exchange resin in the hydrogen form, hydrogen will be substituted or exchanged for the metal ion impurities in solution thereby increasing the free acid of the effluent. One of the unique features of this invention was the discovery, that in addition to the exchange of the metal ion impurities for hydrogen in the cation exchange resin, on passing a black sulfuric acid solution therethrough, the initial effluent material or solutions from the resin column were substantially uncontaminated free sulfuric acid which presented at once solutions containing a high amount of free acid and a high factor of acidity. This phenomenon was followed by further effluent solutions which contained high concentrations or amounts of titanium in solution and which had a factor of acidity comparable to that of the starting material and being more favorable for hydrolysis. The results obtained and the observations permit the following: (1) a recovery of initial effluent cuts from the passage of solutions of a black sulfuric acid liquor through a cation exchange resin in the hydrogen form, said cuts being substantially free sulfuric acid suitable for reuse or other disposition; (2) a recovery of further effluent cuts from the passage of solutions containing high amounts or concentrations of titanium through a cation exchange resin in the hydrogen form, said cuts having a favorable factor of acidity and being readily adaptable for hydrolysis; and (3) a recycle of intermediate cuts through cation exchange resin columns for a continuation of steps (1) and (2). In this process of my invention using a plurality of columns, the number of columns employed is a function of product acid quality or cleaned black solution quality and the number of spare columns required is dependent on rate during exhaustion and on time required for regeneration.

Solutions of sulfuric acid and titanium, devoid of objectionable impurities, can be obtained by passing black solution through one or more columns, i.e. a plurality of columns so that a continuous process is envisaged which includes: (a) diversion of initial high acid, low titanium effluent for reuse; (b) taking subsequent low acid, high titanium effluent for $TiO_2$ recovery; (c) recycling through a fresh column (1) intermediate cuts between (a) and (b) and (2) cuts following (b) higher in impurities than desirable; (d) finally cycling fresh black solution; (e) exhausted columns are removed from the beginning of the train, regenerated individually or in series, and replaced at the end of the train, the number of columns in series remaining the same. The result from such a continuous cycling process is the recovery or removal of free sulfuric acid from fresh solutions from the digestion of a titaniferous ore and the recovery of effluent solutions of high concentrations of titanium for hydrolysis. Further advantages will be found enumerated after the examples of this invention.

In the examples to be given hereinafter, the pregnant solution from the sulfuric acid digestion of titanium bearing ores will be referred to simply as "black liquor," while the sulfuric acid solution obtained as a filtrate from the $TiO_2$ precipitation step will be referred to as "waste acid" or "waste liquor." It should be understood, however, that by "black liquor" it is intended to include the aqueous sulfuric acid from the acid attack either with or without subsequent reduction of the ferric iron to ferrous iron, and clarification by use of a metallic sulfide, glue and the like. It should also be understood that the exact mechanics or the exchange kinetics occurring in the process of my invention are not completely known, and I do not deem it necessary to offer any explanation thereof. My invention rests essentially in the discovery that a cation exchange resin in the hydrogen form will selectively remove unwanted metallic ions from a contaminated sulfuric acid solution while allowing the titanium to pass through the resin, and the recovery of initial effluent cuts from the black liquor contact of substantially pure sulfuric acid, these being the major aspects of this invention. The combined acid is also regenerated and can be reconcentrated and reused in an alternate embodiment of this invention. I have thus found that I can recover from 91 to 98% of the titanium values from a black liquor, as defined above, and about 70% or more of the titanium from a waste liquor which conventionally has been discarded heretofore. Additionally, I am able to overcome the serious pollution problems encountered by the disposal of such waste acids, by virtue of salvage of said acid and by recovery from initial effluent cuts from a cation exchange resin column as noted.

In actual practice of either embodiment of my invention, I have, in one instance, employed flow rates of about 100 cc. per 10 minutes in a six-foot column of one-inch diameter containing a five-foot bed of a cation exchange resin. Higher or lower flow rates can, of course, be used, as is well known in the art. I have also employed a larger column, i.e. six-inch diameter column with corresponding increase in materials charged, etc. Also, I have found that I can employ ordinary room temperatures, i.e., it is not necessary to heat the influent material or cation exchange resin, although such modification of operating procedures is considered well within the scope of this invention. Suffice it to say that I have used flow rates and temperatures known in the literature and have successfully removed cationic impurities from an impure or contaminated sulfuric acid solution. The acidity of the solutions can be varied, and I have found that sulfuric acid concentrations of up to 33% or higher can be employed without causing noticeable damage to the resinous material and also effect purification. The ability to use such high acid concentrations in an operation of this nature was unpredictable.

In instances where the cation exchange resin is obtained in the sodium form, the resin can be converted to the hydrogen form by simply passing an acid solution therethrough, as is known in the prior art.

In operating in accordance with my process, I have introduced the influent material from the bottom of the column and have regenerated the resin by introducing the regenerant material from the top of the column. The reverse process or combination is also adaptable.

In the regeneration cycle in the process of this invention, I have used a 20% solution of hydrochloric acid of a gravity of 1.10 and have used an amount on the order of 680 cc. of total regenerant, that is 338 cc. of C.P. hydrochloric acid plus about 342 cc. of distilled water with the one inch diameter column (with corresponding increase in charge of regenerating solutions in the larger 6-inch diameter column) to regenerate nuclear sulfonic cation exchange resin in a column of a volume of .0273 cu. ft. which has been exhausted with from about 350 to 450 cc. of a waste acid or black liquor solution.

Although I have successfully employed hydrochloric acid solutions for regenerating an exhausted resin, sulfuric acid can also be used but not economically. Additionally, hydrofluoric acid can also be employed but its cost and hazards of handling it leave much to be desired.

I have found that I can recycle an effluent regenerant hydrochloric acid solution one or more times prior to its recovery by evaporation. In this connection, the acid can be readily treated to separate the salts from the free acid, thereby rendering the impurities subject to recovery at some future date for salvage of values. I can also sidestep a dusting problem by adding waste acid to the hydrochloric acid eluate or effluent to recover the combined HCl. However, direct roasting without the addition of waste acid is also feasible. Cycle handling is preferred over use of one long bed to obtain maximum resin life and efficiency.

In order that some of the terminology used in illustrating the process of my invention, as shown by the examples, be more fully understood, the following are general statements regarding such; free acid means the acid present, uncombined, in contrast to that present as combined salts. The free acid is not easily determined, since in some instances unstable salts will hydrolyze or the acid exists as a loose combination with salts or in complex forms. Total acid will include acid combined in salts hydrolyzed at a pH of 7.0 but not neutral salts such as Na, K, Mg, etc. In my results, I have used a pH to 3.9 as an indication of free acid for both HCl and $H_2SO_4$ solutions. Factor of acidity (F.A.) is based on the free acid, that is, non-combined acid, and the acid equivalent of the $TiO_2$, assuming one mole of $H_2SO_4$ per mole of $TiO_2$ expressed as percent. The factor of acidity is a well-known term of art in the production of titanium sulfate solutions, and it is shown in U.S. Patent 2,298,032. The term "titanium values" refers to the titanium present in the sulfuric acid solution in whatever form it may be.

The designation $R_2O_3$ is a determination giving the quantity of materials precipitated by $NH_4OH$, after ignition at 1000° C. to constant weight. It will not include metals which do not precipitate with $NH_4OH$ (e.g. Mg) but will include $Fe_2O_3$, $Al_2O_3$ and $TiO_2$. Total oxides are determined by driving off the excess acid (minimizing spattering as much as possible) and igniting the solids overnight at 1000° C. It should be a measure of the total salt content measured as oxides but will be low by the degree of spattering, the quantity of volatile salts and the amount of dusting. The difference between total oxides and $R_2O_3$ should roughly approximate MgO and each will be a rough check on the other. It should also be mentioned here that for the purpose of illustrating this invention, ferrous iron and total iron are close enough to be called the same and to distinguish would serve no useful purpose.

In presenting examples illustrative of the process of this invention, Examples 1 to 9 represent data obtained from a column one inch in diameter as described above. These examples illustrate the passage of black sulfuric acid solutions and waste acids through the column and the character of the effluent solutions with regard to amount of titanium values present and also iron values which are the main impurity in such solutions. Regeneration data are also given as well as analysis of effluent titanium-containing acid solutions.

Examples are also offered showing the results obtained by treatment of black sulfuric acid solutions with a cation exchange resin in a column of six inch diameter. These examples will show the nature and characteristics of the acid solutions which precede the solutions containing the bulk of the titanium values. The advantages to be realized from the process of this invention will henceforth be more clearly understood by reference to the examples presented below and the data offered.

EXAMPLE 1

Part A

In a titanium dioxide manufacturing plant, a mixture of ilmenite and slag, about 75 to 80% slag, was fed to a comminuting apparatus and the resulting mixture was thereafter attacked with sulfuric acid at an elevated temperature in a chamber to form a cake or digest mass. The mixture was then cooled and dissolved in aqueous media to solubilize the metallic sulfates or salts and then allowed to settle. The liquid, after the conventional reduction and clarification steps, was separated therefrom. A batch of 1300 cc. of this black liquor was taken for treatment in accordance with my invention. The black liquor analysis is shown in Table I below.

TABLE I.—BLACK LIQUOR ANALYSIS

| | |
|---|---|
| Specific gravity at 24° C. | 1.4826 |
| $TiO_2$, grams/liter | 179.9 |
| Total iron, grams/liter | 39.9 |
| $Al_2O_3$, grams/liter | 12.5 |
| MgO, grams/liter | 13.6 |
| $R_2O_3$, grams/liter | 250.0 |
| Total oxides, grams/liter | 258.5 |
| Free acid ($H_2SO_4$) [1], percent | 21.30 |

[1] Titrated to a pH of 3.9.

To a column of one-inch diameter, six feet in height and containing five feet of wetted nuclear sulfonic acid cation exchange resin, in the hydrogen form, the above solution was added and the effluent from the column was separated into a series of cuts. The first three cuts were analyzed for titanium dioxide, and the first six cuts for percent free sulfuric acid and grams per liter of ferrous iron. Although an analysis of all the impurities in the effluent was not obtained, it will be shown hereinafter that the acid products as finally recovered contain substantially none of the influent undesired materials. The following data were obtained from the effluent:

[Influent: 1,300 cc. of black liquor; effluent as follows (cuts)]

| Cut No. | Vol., cc. | Percent free $H_2SO_4$ | Sp. gr. | G./l. Fe++ | G./l. $TiO_2$ | $R_2O_3$ | G./l. MgO |
|---|---|---|---|---|---|---|---|
| 1 | 88 | 4.75 | 1.01 | nil | 2.4 | | |
| 2 | 103 | 18.72 | 1.22 | 0.64 | 94 | | |
| 3 | 109 | 23.81 | 1.38 | 1.92 | 184.8 | 187.5 | 2.3 |
| 4 | 115 | 28.42 | 1.42 | 15.87 | | | |
| 5 | 117 | 26.70 | 1.45 | 20.04 | | | |
| 6 | 109 | 23.53 | 1.47 | 34.62 | | | |
| 7 | 232 | | 1.48 | | | | |
| 8 | 115 | | 1.48 | | | | |
| 9 | 36 | | | | | | |
| 10 | 239 | | 1.47 | | | | |
| 11 | 103 | | 1.32 | | | | |
| 12 | 43 | | 1.21 | | | | |
| 13 | 114 | | 1.22 | | | | |
| 14 | 116 | | 1.15 | | | | |
| 15 | 127 | | 1.01 | | | | |
| 16 | 68 | | 1.00 | | | | |

From the above data, it can be seen that the first three cuts resulted in a solution of substantially no ferrous iron content. Cut No. 3 contained substantially only the titanium ion. It should be noted that the values for cut No. 6 and below indicate the exhaustion of the resin. Also about 1000 cc. of a 1 to 2% $H_2SO_4$ solution was added to the column after the introduction of the black liquor.

Part B

The exhausted column from Part A through which the 1300 cc. of black liquor had been passed was next regenerated with 681 cc. of a 20% solution of hydrochloric acid (338 cc. of C.P. HCl plus 343 cc. $H_2O$) followed by a water wash, and the effluent was separated into several cuts as shown below and analyzed for percent free HCl at pH 3.9 and ferrous iron in grams per liter.

| Effluent (cuts) | Volume cc. | Percent HCl | G./l. Fe++ |
|---|---|---|---|
| 1 | 114 | 7.59 | 8.18 |
| 2 | 109 | 5.03 | 32.54 |
| 3 | 107 | 6.08 | 53.38 |
| 4 | 119 | 13.62 | 26.93 |
| 5 | 113 | 18.57 | 6.73 |
| 6 | 117 | 19.95 | 2.4 |
| 7 | 100 | 19.98 | 1.12 |
| 8 | 96 | 7.24 | 0.64 |
| 9 | 279 | | ([1]) |

[1] Gravity of 1.0.

The first eight cuts were thereafter taken, combined and ignited and the residue analyzed to give the following results:

| Oxide: | Percent |
|---|---|
| $TiO_2$ | 16.62 |
| $Fe_2O_3$ | 53.4 |
| $Al_2O_3$ | 14.94 |
| MgO | 13.59 |
| Others | 1.45 |
| Total | 100.00 |

While the initial black liquor had a concentration of about 179.9 grams per liter calculated as $TiO_2$, only a minor amount of this value was retained on the resin. Yet, the bulk of the contaminating cations was removed from the solution as shown by the analysis of the ignited residue from the hydrochloric acid regenerating solution.

EXAMPLE 2

To a regenerated nuclear sulfonic cation exchange resin column, there was added, in order, sulfuric acid fractions resulting from the passage of a black liquor successively through two resin columns as described in Part A and the eluate collected in several fractions or cuts.

After the addition of several hundred cc. of these fractions, a black liquor was also added. The results are shown below:

| Influent | | | | | Effluent Product from 3 col. black liquor run | | | | |
|---|---|---|---|---|---|---|---|---|---|
| Vol. cc. | Fractions | Percent $H_2SO_4$ | Fe++ g./l. | $TiO_2$ g./l. | Vol. cc. | Color | Percent $H_2SO_4$ | Fe++ g./l. | Disposition |
| 48 | 1 | 11.7 | Nil | --- | --- | --- | --- | --- | |
| 84 | 2 | 19.3 | Nil | 91.2 | --- | --- | --- | --- | |
| 98 | 3 | 22.7 | 0.16 | 180.8 | --- | --- | --- | --- | |
| 87 | 4 | 26.5 | 1.44 | 189.2 | --- | --- | --- | --- | |
| 110 | 5 | 29.3 | 2.89 | --- | --- | --- | --- | --- | |
| 111 | 6 | 29.7 | 8.02 | --- | --- | --- | 13.2 | Nil | $TiO_2$ recovery. |
| 100 | 7 | 27.2 | 17.63 | --- | 120 | Water white | 19.47 | Nil | Do. |
| 94 | 8 | 24.9 | 24.37 | --- | 122 | ...do... | 21.88 | 0.16 | Do. |
| 220 | 9 | 22.8 | 27.25 | --- | 121 | Slight blue green | 24.71 | 0.32 | Recycle. |
| 250 | 10-12 | 18.89 | 31.1 | --- | 125 | Light olive green | 28.43 | 2.08 | Do. |
| --- | --- | --- | --- | --- | 124 | Dark | 30.39 | 2.40 | Do. |
| --- | --- | --- | --- | --- | 113 | ...do... | 30.79 | 3.53 | |
| 325 | 10-12 | --- | --- | --- | 120 | | 29.55 | 9.14 | |
| | | | | | 128 | | 27.0 | 15.87 | |
| | | | | | 110 | | 23.38 | 21.0 | |
| | | | | | 213 | | 21.0 | 35.1 | |
| | | | | | 521 | | | | |
| | | | | | 314 low gravity, discarded. | | | | |

250 cc. black liquor (see Table I for analysis).

In the above example, the first 500 cc. of effluent liquor contained little or no ferrous ion (or other contaminants) but contained the bulk of the titanium values. The next approximate 500 cc. of material began to show some ferrous ion indicating partial exhaustion of the resin, leakage, etc. Since the resin was not completely exhausted, black liquor was added and further cuts collected to be thereafter passed through a second, third and even fourth column. Note also the high acid values of the first seven cuts which indicate regeneration of the acid from passage of salts through the resin column.

EXAMPLE 3

Although I have shown regeneration of an exhausted column by a fresh 20% hydrochloric acid solution, in order to reduce waste and improve the efficiency of my operation, I can also employ a contaminated hydrochloric acid solution, such as one obtained as an effluent from a prior regeneration, to begin the regeneration of an exhausted resin column. The regenerant "recycle" hydrochloric acid in this case was analyzed for percent hydrochloric acid, i.e., titrated to a pH of 3.9, and for ferrous ion in grams per liter. The effluent was also analyzed for the same values. The following recycle cuts, 168 cc. of fresh 20% hydrochloric and 1000 cc. of 2% sulfuric acid solution were added in succession. The following are the results obtained:

| Cut No. | Influent | | | Effluent | | |
|---|---|---|---|---|---|---|
| | Vol. cc. | Percent HCl | Fe++ g./l. | Vol. cc. | Percent HCl | Fe++ g./l. |
| 1 | 108 | 6.13 | 40.5 | --- | --- | --- |
| 2 | 118 | 10.83 | 36.07 | --- | --- | --- |
| 3 | 112 | 17.52 | 10.42 | --- | --- | --- |
| 4 | 108 | 19.24 | 3.21 | 120 | 2.74 | 2.89 |
| 5 | 122 | 19.45 | 1.28 | 117 | 5.54 | 14.11 |
| 6 | 95 | 20.00 | 0.64 | 103 | 7.6 | 27.89 |
| | | | | 105 | 7.7 | 40.40 |
| | | | | 104 | 9.5 | 43.60 |
| 168 cc. of 20% HCl | | | | 106 | 13.7 | 29.1 |
| 1 liter of 2% $H_2SO_4$ | | | | 108 | 17.35 | 13.47 |
| | | | | 118 | 19.0 | 6.25 |
| | | | | 103 | 19.6 | 2.24 |
| | | | | 71 | 15.88 | 1.28 |
| | | | | 106 | (¹) | 1.00 |

¹ Low specific gravity (discarded).

In the above example, the completion of regeneration was indicated by the falling iron and rising HCl values,

EXAMPLE 4

Effluents from several batches of black liquor, after being passed through three columns, were combined into two groups and analyzed with the following results:

| | Product acid | |
|---|---|---|
| | Bulk I, Vol. 1814 cc. from 8 batches | Bulk II, Vol. 2614 cc. from 3 batches |
| Specific gravity | 1.24 | 1.19 |
| $TiO_2$, g./l. | 102.4 | 75.5 |
| Fe total g./l. | 0.64 | 0.64 |
| Total acid g./l. (neutralized to pH 7) | 259.5 | 224.0 |

Although the above product acid does not indicate the values for the other metals, the amounts contained, if any, were negligible. Note the low value of the total iron present in the product.

EXAMPLE 5

In this example, both recycle effluent from black liquor and black liquor were oxidized with $H_2O_2$ and then contacted with a nuclear sulfonic cation exchange resin in the same manner as demonstrated in the examples above. I found that even though the iron was in the trivalent form, it did not in any way interfere with the selective passage of the titanium values through the resin or the retention or removal of all the other metallic cations including ferric by the cation exchange resin. Thus, as mentioned heretofore, I can eliminate the reduction step in practicing the process of my invention. By this modification, the process of my invention results in reduced operating costs and material.

Concentrated regeneration cuts from each of 7 batches were combined, evaporated and ignited to recover the acid for further reuse and an analysis of the sinter was obtained as shown in Table II below.

TABLE II.—SINTER FROM THE HCl RECYCLE EFFLUENT

| Oxide: | Percent |
|---|---|
| $TiO_2$ | 8.96 |
| $Fe_2O_3$ | 65.6 |
| $R_2O_3$ | 84.31 |
| $Al_2O_3$ | 9.8 |
| MgO | 15.0 |

From the seven batches which were ignited, the total sinter weighed 136.4 grams or an average of 19.5 grams of sinter per batch which analyzed as in Table II above. Each batch represented about 300 cc. of black liquor. Thus, the titanium recovery from this method of treating black liquor using assays to give the lowest recovery amounted to over 92%. In other runs I have succeeded in recovering up to 97% of the titanium present.

The following specific examples show the effect of contacting a waste acid solution in accordance with my invention. The method of contact and the operating procedure for the waste acid is essentially the same as with the black liquor.

A batch of waste acid was taken from the filtrate of the $TiO_2$ precipitation step in a plant manufacturing titanium dioxide. Table III, below, shows the results of an analysis of the acid. Waste acids, analyzing typically as shown below, were used as the starting liquors for the specific examples that follow the table.

TABLE III

| | |
|---|---|
| Specific gravity at 27° C | 1.29 |
| $H_2SO_4$ free (titrated to pH of 3.9) percent | 22.1 |
| Ferrous iron, g./l | 29.7 |
| $Al_2O_3$, g./l | 8.4 |
| MgO, g./l | 9.2 |
| $TiO_2$, g./l | 4.0 |
| $Cr_2O_3$, g./l | 0.4 |
| MnO, g./l | 0.4 |
| $V_2O_4$, g./l | 0.9 |

EXAMPLE 6

A run with 1300 cc. of the above waste acid was made on fresh wetted nuclear sulfonic acid cation exchange resin after it was converted to the hydrogen form by treating with 675 cc. of a 20% HCl solution.

The waste acid was fed to the bottom of the column and cuts coming off the top were tested as below. Water followed the waste acid to displace acid in the column.

| Cut No. | Volume cc. | Free $H_2SO_4$ Percent | Total Fe g./l. |
|---|---|---|---|
| 1 | 150 | 2.14 | 0.13 |
| 2 | 127 | 16.8 | 0.64 |
| 3 | 112 | 25.5 | 1.44 |
| 4 | 109 | 26.5 | 9.8 |
| 5 | 122 | 24.3 | 16.0 |
| 6 | 125 | 22.6 | 23.1 |
| 7 | 123 | 21.9 | 28.8 |
| 8 | 118 | 21.8 | 28.8 |
| 9 | 120 | 21.9 | 31.4 |
| 10 | 125 | 21.6 | 32.4 |
| 11 | 122 | 21.5 | 29 |
| 12 | 721 | 6.43 | 5.1 |

As in Example 1 with the black liquor, the first few cuts taken contained substantially no iron and a high percent of free sulfuric acid, but thereafter the iron value increased as the resin became exhausted. Complete exhaustion was indicated by the identical nature of the influent and effluent material.

The initial effluent from a regenerated resin column is the best quality acid product, that is, the first few effluent cuts, and its recovery is only limited by the number of columns through which it is passed. Also, cation leakage in the initial effluent of a regenerated column is at a minimum. However, when this breakthrough occurs, the resin still has appreciable capacity.

The capacity of the resin is a function of the quantity and quality of the last solution passed through it, and, up to the potential capacity of the resin, the amount of cations held will be in equilibrium with the liquid feed. Thus, for highest efficiency, this capacity should be utilized.

In my examples, the modus operandi was stepwise batch treatment to simulate continuous multi-column operation while still being able to follow what was happening.

EXAMPLE 7

The exhausted resin from Example 6 was regenerated with a 20% hydrochloric acid solution as before. The specific gravity of the regenerant acid was 1.10 and the total introduced to the column was 675 cc. The effluent was analyzed for ferrous iron and for percent hydrochloric acid. The following are the cuts of the effluent regenerant solution.

| Cut No. | Vol. cc. | Percent HCl (to pH 3.9) | $Fe^{++}$ g./l. |
|---|---|---|---|
| 1 | 103 | 0.97 | 0.87 |
| 2 | 117 | 3.12 | 9.33 |
| 3 | 118 | 6.1 | 27.6 |
| 4 | 117 | 10.5 | 30.3 |
| 5 | 119 | 16.5 | 13.8 |
| 6 | 119 | 18.6 | 5.1 |
| 7 | 117 | 19.5 | 2.1 |
| 8 | 114 | 18.1 | 0.96 |
| Water cut | 97 | 2.6 | .033 |

The above data show that as the bulk of the ferrous cation is removed, the percent free hydrochloric acid increases while the ferrous iron in grams per liter decreases until it becomes negligible. At this point the resin is ready for reuse.

EXAMPLE 8

To a resin column regenerated as above, there was added successively recycle waste acid fractions followed by waste acid itself as given below.

| Fractions | Influent | | | Effluent | | |
|---|---|---|---|---|---|---|
| | Vol. cc. | Free acid $H_2SO_4$, percent | $Fe^{++}$ g./l. | Cc. | Percent $H_2SO_4$ | $Fe^{++}$ g./l. |
| 1 | 119 | | 4.8 | | | |
| 2 | 120 | | 9.76 | | | |
| 3 | 99 | 31.9 | 15.68 | | | |
| 4 | 109 | 31.4 | [1] 20 | | | |
| 5 | 113 | 27.4 | [1] 20 | | | |
| 6 | 114 | 27.0 | [1] 20 | 113 | 7.3 | 0.45 |
| 7 | 118 | | [1] 20 | 118 | 20.99 | 0.32 |
| 8 | 115 | | [1] 26 | 115 | 29.64 | 1.6 |
| 9 | 123 | | [1] 26 | 116 | 32.25 | 4.16 |
| 10 and 11 | 362 | | [1] 26 | 118 | 33.35 | 8.00 |
| | | | | 116 | 31.41 | 12.64 |
| | | | | 117 | 30.27 | 14.40 |
| 12 and 13 | 208 | | [1] 29 | 125 | 27.67 | 17.76 |
| | | | | 117 | 26.84 | 17.28 |
| 14 | 45 | | | | | |
| Waste acid [2] 500 cc | | | 29.7 | 123 | 25.98 | 20.32 |
| | | | | 115 | 25.24 | 21.44 |
| | | | | 117 | 23.48 | 23.42 |
| | | | | 114 | 23.60 | 25.6 |
| | | | | 114 | 22.94 | 26.24 |
| 500 cc. $H_2O$ | | | | 288 | 23.16 | 22.72 |
| | | | | 65 | 23.37 | 26.24 |
| | | | | 250 | 22.63 | 28.16 |
| | | | | 200 | Unknown (gravity of 1.05) | |

[1] Estimated.
[2] See Table III for analysis.

In the above example, I have shown that I can recycle an effluent acid from a previous column and can also include as the charge a fresh acid to substantially completely exhaus the cation exchange resin before it is regenerated.

EXAMPLE 9

This example demonstrates the use of effluent hydrochloric acid solution fractions from a previous regeneration run to partially regenerate an exhausted resin column. Additionally, fresh 20% hydrochloric acid was also added in regenerating the column substantially completely as shown below. The following were the results obtained:

| Fraction No. | Influent | | Effluent | | | |
|---|---|---|---|---|---|---|
| | Vol. cc. | Specific Gravity | Vol. cc. | Gravity | Percent HCl (to pH 3.9) | Fe++ g./l. |
| 1 | 125 | 1.12 | | | | |
| 2 | 125 | 1.11 | | | | |
| 3 | 131 | 1.11 | | | | |
| 4 | 113 | 1.09 | | | | |
| 5 | 113 | 1.10 | 114 | 1.10 | 7.26 | 23.4 |
| 6 | 109 | 1.09+ | 119 | 1.12 | 9.56 | 33.3 |
| Fresh 20% HCl | 169 | 1.10 | 120 | 1.13 | 12.65 | 26.3 |
| | | | 113 | 1.12 | 16.75 | 13.1 |
| 1 liter H₂O | | | 118 | 1.10 | 18.58 | 5.1 |
| | | | 128 | 1.09 | 19.31 | 2.9 |
| | | | 108 | 1.09 | 21.32 | 1.6 |
| | | | 143 | 1.09 | 17.23 | 1.3 |
| | | | 344 | 1.0 | | |

It will be noted that the last cuts in the effluent column indicate that the resin column is substantially regenerated as shown by the specific gravity of the solution, as well as the high percent of HCl and negligible amount of ferrous ion present in the effluent. Also, the first effluent cuts contain a high amount of iron indicating regeneration by ion exchange. The regenerated resin in the column is ready for a new charge of waste acid and a repeat of the cycle, exhaustion, backwash, regeneration, etc.

Thus, by the above specific examples, I have shown the applicability of a cation exchange resin in treating a waste acid and a black liquor to obtain a product which is suitable for the recovery of the substantially unaffected titanium ion, as well as an acid which can be reconcentrated and reused. Moreover, an added feature of my process is the adaptability of a contaminated hydrochloric acid, after passage through one or more exhausted resin columns, for further use as a regenerant until the hydrochloric acid itself is ineffective in its role as a regenerating solution.

In order to show the state of the final solutions of product acid after passage of waste acid through three and four resin columns, the following data are offered:

TABLE IV

| Analysis | Waste acid | 3-column acid | 4-column acid |
|---|---|---|---|
| Specific gravity | 1.29 | 1.11 | 1.11 |
| Percent H₂SO₄ | 22.1 | 17.6 | 16.0 |
| Total Fe, g./l. | 29.7 | 1.78 | 0.0 |
| TiO₂, g./l. | 4.0 | 2.12 | 0.96 |
| Total oxides, g./l. | 66.3 | 5.7 | 3.0 |
| R₂O₃, g./l. | 54.9 | 4.1 | 2.1 |
| MgO, g./l. | 9.2 | 0.8 | 0.34 |
| Al₂O₃, g./l. | 8.4 | Nil | |

The striking results obtained by a 3- and 4-column acid treatment or contact in comparison with the untreated waste acid are immediately apparent from a glance of Table IV. Not only is the sulfuric acid from the 3-column contact suitable for reconcentration and reuse, but it is also suitable for the recovery of titanium which would ordinarily be lost as waste matter.

In some of the above examples the recovery of iron has been emphasized since this impurity is usually present in larger amounts than other metallic salts. Removal of other metallic ions is, of course, accomplished as in the case of iron.

In the examples which follow, a black sulfuric acid solution was passed through a column of six inches in diameter and containing a cation exchange resin as above, in the hydrogen form.

In Example 10 below, the influent solution (cuts 1 to 26) was taken from the effluent of a five pass column. The effluent data shows percent free sulfuric acid and factor of acidity in addition to grams per liter of titanium. In the tabular summaries of Examples 10, 11, 12, and 13, below, the volume of a particular cut or fraction is measured in cc., the density of the cut in grams per milliliter, and the term "percent F.A." stands for "Factor of Acidity."

EXAMPLE 10

| Influent | Effluent | | | | | | | |
|---|---|---|---|---|---|---|---|---|
| | Cut | Vol. | Density | Percent free H₂SO₄ | g./l. TiO₂ | g./l. Fe | Percent FA [1] | Disposition |
| 1 | | | | | | | | |
| 2 | | | | | | | | |
| 3 | | | | | | | | |
| 4 | | | | | | | | |
| 5 | | | | | | | | |
| 6 | 1 | 2,400 | 1.02 | 5.29 | 4.0 | 0.43 | 1,032 | Discard. |
| 7 | 2 | 2,400 | 1.03 | | | | | Hold out. |
| 8 | 3 | 2,400 | 1.05 | 7.87 | 2.4 | 0.12 | 2,760 | |
| 9 | 4 | 2,400 | 1.07 | | | | | Recycle. |
| 10 | 5 | 2,400 | 1.08 | 12.65 | 3.2 | 0.05 | 3,420 | Do. |
| 11 | 6 | 2,400 | 1.10 | 15.67 | 3.4 | | 4,130 | Do. |
| 12 | 7 | 2,400 | 1.21 | 20.34 | 68.0 | 0.11 | 210 | Do. |
| 13 | 8 | 2,400 | 1.29 | | | | | Do. |
| 14 | 9 | 2,400 | 1.33 | 22.43 | 167.2 | | 60.4 | Do. |
| 15 | 10 | 2,400 | 1.35 | 22.80 | 173.2 | 0.11 | 60.6 | Do. |
| 16 | 11 | 2,400 | 1.35 | | | | | Do. |
| 17 | 12 | 2,400 | 1.35 | | | | | Do. |
| 18 | 13 | 2,400 | 1.37 | 23.76 | 186.2 | 0.27 | 62.0 | Do. |
| 19 | 14 | 2,400 | 1.35 | | | | | Do. |
| 20 | 15 | 2,400 | 1.35 | | | | | Do. |
| 21 | 16 | 2,400 | 1.35 | | | | | Do. |
| 22 | 17 | 2,400 | 1.36 | 26.51 | 166.2 | 0.75 | 96.8 | |
| 23 | 18 | 2,400 | 1.35 | | | | | Do. |
| 24 | 19 | 2,400 | 1.35 | 27.20 | 165.0 | 0.79 | 99.0 | Do. |
| 25 | 20 | 2,450 | 1.35 | | | | | Do. |
| 26 | 21 | 2,400 | 1.35 | 27.42 | 154.5 | 1.67 | 117.1 | Do. |
| Bulk [2] | 22 | 2,400 | 1.35 | | | | | |
| | 23 | 2,400 | 1.35 | 27.25 | 153 | 2.14 | 116.3 | |
| | 24 | 2,200 | 1.35 | | | | | Do. |
| 7 liters of black solution | 25 | 8,000 | 1.35 | 27.53 | 155.3 | 6.85 | 116.9 | Do. |
| | 26 | 2,400 | 1.35 | | | | | Do. |
| | 27 | 2,400 | 1.36 | 26.84 | 150.5 | 11.8 | 123.9 | Do. |
| | 28 | 2,300 | 1.36 | 26.95 | 157.6 | 12.6 | 110.5 | |
| | L1-6 | 14,300 | 1.42 | 20.59 | 186 | 38.2 | 76.6 | Do. |
| Feed | | | 1.44 | 21.53 | 175.6 | 41.6 | | |

[1] Neglecting iron.
[2] Bulk—designation given to black solution column drainings just before regeneration. The feed was stopped and 2% acid water was admitted to the top of the column until all black solution was washed out.

EXAMPLE 11

The effluent from the column of Example 10 (cuts 5 through 28) was taken for introduction as influent solution to the column of this example.

| Influent | Effluent ||||||| |
|---|---|---|---|---|---|---|---|
| | Cut | Vol. | Density | Percent free $H_2SO_4$ | g./l. $TiO_2$ | g./l. Fe | Percent FA[1] | Disposition |
| 5 | | | | | | | | |
| 6 | | | | | | | | |
| 7 | | | | | | | | |
| 8 | | | | | | | | |
| 9 | | | | | | | | |
| 10 | 1 | 1,200 | 1.03 | | | | | Hold. |
| 11 | | | | | | | | |
| 12 | 2 | 2,400 | 1.08 | | | | | Do. |
| 13 | 3 | 2,400 | 1.09 | 13.80 | 2.00 | 0.25 | 6,216 | Recycle. |
| 14 | 4 | 2,400 | 1.13 | 16.99 | 16.0 | | 910 | Do. |
| 15 | 5 | 2,400 | 1.24 | 21.05 | 90.8 | 0.22 | 156 | Product. |
| 16 | 6 | 2,400 | 1.30 | | | | | Do. |
| 17 | 7 | 2,400 | 1.34 | 22.23 | 166.8 | 0.14 | 69.6 | Do. |
| 18 | 8 | 2,400 | 1.35 | | | | | Do. |
| 19 | 9 | 2,400 | 1.35 | 22.87 | 185.6 | 0.16 | 58.1 | Recycle. |
| 20 | 10 | 2,400 | 1.35 | | | | | Do. |
| 21 | 11 | 2,400 | 1.35 | 23.43 | 184.5 | 0.84 | 65.0 | Do. |
| 22 | 12 | 2,400 | 1.36 | | | | | Do. |
| | 13 | 2,400 | 1.36 | 24.06 | 180.0 | 1.02 | 72.1 | Do. |
| 23 | 14 | 2,400 | 1.36 | | | | | Do. |
| 24 | 15 | 2,400 | 1.35 | 24.39 | 164.0 | 0.83 | 89.9 | Do. |
| 25 | 16 | 2,400 | 1.36 | | | | | Do. |
| | 17 | 2,400 | 1.36 | 26.77 | 162.4 | 1.38 | 106.1 | |
| | 18 | 2,400 | 1.36 | | | | | Do. |
| 26 | 19 | 1,400 | 1.36 | 27.00 | 159.2 | 1.35 | 110.3 | Do. |
| 27 | 20 | 2,400 | 1.36 | | | | | Do. |
| 28 | 21 | 2,400 | 1.36 | 26.70 | 159.2 | 1.63 | 117.9 | |
| Bulk | 22 | 2,400 | 1.37 | | | | | Do. |
| | 23 | 2,400 | 1.36 | 27.00 | 154.4 | 3.36 | 125.7 | |
| | 24 | 2,400 | 1.37 | | | | | Do. |
| | 25 | 2,400 | 1.37 | 26.71 | 155.0 | 8.70 | 123.5 | |
| | 26 | 2,400 | 1.37 | | | | | Do. |
| | 27 | 2,400 | 1.37 | 26.61 | 156.3 | 8.89 | 120.9 | Do. |
| 10 liters of black solution | 28 | 2,400 | 1.37 | | | | | Do. |
| | 29 | 2,300 | 1.37 | 26.80 | 155.0 | 10.88 | 124.0 | Do. |
| | 30 | 2,400 | 1.38 | | | | | Do. |
| | 31 | 2,400 | 1.38 | 26.10 | 157.5 | 13.11 | 120.0 | |
| | 32 | 2,400 | 1.38 | | | | | Do. |
| | Bulk | 14,900 | 1.44 | 19.69 | 162.5 | 38.6 | 106.2 | |

[1] Neglecting iron.

EXAMPLE 12

The influent solution for this example was taken from the effluent cuts of Example 11 above (cuts 3 to 32).

| Influent | Effluent ||||||| |
|---|---|---|---|---|---|---|---|
| | Cut | Vol. | Density | Percent free $H_2SO_4$ | g./l. $TiO_2$ | g./l. Fe | Percent FA[1] | Disposition |
| 3 | | | | | | | | |
| 4 | | | | | | | | |
| 10 | | | | | | | | |
| 11 | | | | | | | | |
| 12 | | | | | | | | |
| 13 | 1 | 2,400 | 1.02 | | | | | Discard. |
| 14 | | | | | | | | |
| 15 | 2 | 2,400 | 1.07 | 11.35 | 1.6 | 0.39 | 6,258 | Hold. |
| 16 | 3 | 2,400 | 1.09 | 14.46 | 1.6 | .03 | 8,100 | Recycle. |
| 17 | 4 | 2,400 | 1.18 | 19.63 | 60.0 | .07 | 248 | Do. |
| 18 | 5 | 2,400 | 1.32 | 22.15 | 165.5 | .04 | 68.1 | Product. |
| 19 | 6 | 2,400 | 1.35 | 22.45 | 184.0 | .05 | 61.7 | Do. |
| 20 | 7 | 2,450 | 1.35 | 23.05 | 182.5 | .07 | 61.7 | Do. |
| 21 | 8 | 2,400 | 1.35 | 23.55 | 180.4 | .23 | 68.4 | Recycle. |
| 22 | 9 | 2,400 | 1.35 | | | .46 | | Do. |
| 23 | 10 | 2,400 | 1.35 | 23.71 | 175.4 | .31 | 67.5 | Do. |
| 24 | 11 | 2,400 | 1.35 | | | .68 | | Do. |
| 25 | 12 | 2,400 | 1.35 | 24.92 | 167.0 | .87 | 92.8 | Do. |
| 26 | 13 | 2,400 | | | | .87 | | Do. |
| 27 | 14 | 2,400 | 1.35 | 26.60 | 161.0 | .43 | 107.1 | Do. |
| 28 | 15 | 2,450 | 1.35 | | | | | Do. |
| 29 | 16 | 2,400 | 1.35 | 26.60 | 158.4 | 1.71 | 113.1 | Do. |
| 30 | 17 | 2,400 | 1.35 | | | | | Do. |
| 31 | 18 | 2,400 | 1.35 | 27.10 | 155.2 | 3.56 | 120.9 | Do. |
| 32 | 19 | 2,400 | 1.35 | | | | | Do. |
| Bulk | 20 | 2,400 | 1.35 | 27.30 | 154.4 | 5.80 | 125.3 | Do. |
| | 21 | 2,400 | 1.36 | | | | | Do. |
| | 22 | 2,400 | 1.37 | 26.81 | 152.8 | 8.20 | 121.0 | Do. |
| | 23 | 2,450 | 1.37 | | | | | Do. |
| | 24 | 2,400 | 1.37 | 26.71 | 156.0 | 10.4 | 120.8 | Do. |
| | 25 | 1,800 | 1.37 | | | | | Do. |
| 18 liters o black solution | 26 | 1,700 | 1.38 | 26.62 | 159.2 | 11.8 | 118.2 | Do. |
| | 27 | 2,400 | 1.38 | | | | | Do. |
| | 28 | 2,400 | 1.38 | 26.41 | 164.8 | 13.1 | 110.3 | Do. |
| | 29 | 2,400 | 1.39 | | | | | Do. |
| | 30 | 2,400 | 1.38 | 27.29 | 165.6 | 13.0 | 110.3 | Do. |
| | 31 | 2,400 | 1.38 | 26.95 | 165.6 | 14.8 | 116.0 | Do. |
| | 32 | 2,400 | 1.42 | 24.40 | 165.6 | 20.5 | 112.4 | Do. |
| | 33 | 2,400 | 1.42 | | | | | Do. |
| | 34 | 1,500 | 1.43 | 20.95 | 174.4 | 27.5 | 94.2 | Do. |
| | Bulk | 15,600 | 1.45 | 19.88 | 160.0 | 41.0 | 119.0 | Do. |

[1] Neglecting iron.

EXAMPLE 13

The influent solution for this example was taken from the effluent cuts of Example 12 above (cuts 3 to 34).

4 liters—in Example 12. In subsequent runs I have recovered from initial effluent cuts, solutions of a free sulfuric acid approximating 15% and a factor of acidity

| Influent | Effluent ||||||||
|---|---|---|---|---|---|---|---|---|
| | Cut | Vol. | Density | Percent free $H_2SO_4$ | g./l. $TiO_2$ | g./l. Fe | Percent FA [1] | Disposition |
| 3 | | | | | | | | |
| 4 | | | | | | | | |
| 8 | | | | | | | | |
| 9 | | | | | | | | |
| 10 | | | | | | | | |
| 11 | 1 | 2,400 | 1.06 | | | | | Hold. |
| 12 | 2 | 2,400 | 1.09 | 14.73 | 2.4 | (2) | 54.8 | Recycle. |
| 13 | 3 | 2,400 | 1.20 | 20.30 | 68.8 | .09 | 200 | Do. |
| 14 | 4 | 2,400 | 1.32 | 21.95 | 164.0 | .07 | 59 | Do. |
| 15 | 5 | 2,400 | 1.35 | 23.65 | 176.8 | .21 | 62.9 | Product. |
| 16 | 6 | 2,400 | 1.36 | 25.00 | 176.8 | .23 | 71.2 | Do. |
| 17 | 7 | 2,400 | 1.36 | 24.18 | 171.2 | .45 | 73.7 | Do. |
| 18 | 8 | 2,400 | 1.36 | 24.53 | 168.0 | .55 | 75.5 | Recycle. |
| 19 | 9 | 2,400 | 1.36 | | | .93 | | Do. |
| 20 | 10 | 2,400 | 1.36 | 25.35 | 164.8 | .96 | 89.6 | Do. |
| 21 | 11 | 2,400 | 1.36 | | | | | Do. |
| 22 | 12 | 2,400 | 1.36 | 26.20 | 162.0 | 2.18 | 94.2 | Do. |
| 23 | 13 | 2,400 | 1.36 | | | | | Do. |
| 24 | 14 | 2,400 | 1.36 | 27.00 | 155.2 | 4.4 | 103.9 | Do. |
| 25 | | | | | | | | Do. |
| 26 | 15 | 2,400 | 1.36 | | | | | |
| 27 | 16 | 2,400 | 1.36 | 27.39 | 152.0 | 8.4 | 122.1 | Do. |
| 28 | 17 | 2,400 | 1.36 | | | | | |
| 29 | 18 | 2,400 | 1.37 | 27.39 | 152.0 | 10.6 | 120.2 | Do. |
| 30 | 19 | 2,400 | 1.37 | | | | | |
| 31 | 20 | 2,400 | 1.37 | 27.45 | 154.8 | 8.65 | 116.4 | Do. |
| 32 | 21 | 2,400 | 1.37 | | | | | Do. |
| 33 | 22 | 2,400 | 1.38 | | | | | Do. |
| 34 | 23 | 2,400 | 1.38 | | | | | Do. |
| Bulk | 24 | 2,400 | 1.38 | 26.82 | 162.0 | 12.2 | 105.0 | Do. |
| | 25 | 2,400 | 1.38 | | | | | Do. |
| | 26 | 2,400 | 1.38 | | | | | Do. |
| | 27 | 2,400 | 1.38 | | | | | Do. |
| | 28 | 2,400 | 1.38 | 28.00 | 171.6 | 12.8 | 100.3 | Do. |
| 12 liters of black solution | 29 | 2,400 | 1.38 | | | | | Do. |
| | 30 | 2,400 | 1.38 | | | | | Do. |
| | 31 | 2,400 | 1.39 | | | | | Do. |
| | 32 | 2,000 | 1.39 | 29.10 | 162.8 | 19.9 | 118.1 | Do. |
| | 33 | 6,000 | 1.43 | 25.15 | 162.8 | 28.3 | 113.0 | Do. |
| | 34 | 97 | 1.44 | 24.60 | 162.0 | 35.0 | 117.0 | Do. |
| | Bulk | 13,400 | 1.49 | 22.20 | 178.5 | 44.3 | 98.7 | Do. |

[1] Neglecting iron.
[2] Absent.

From Examples 10 through 13 above, it can be seen that I have obtained effluent cuts in each of the passes containing a very high percentage of titanium while at the same time obtaining solutions of a low iron content and a factor of acidity more suitable for hydrolysis. It should be understood from each of the examples above that the influent solutions charged to the columns containing the cation exchange resin are solutions taken from a process simulating a continuous cycling process. For example, the influent solutions of Example 11 are made up not only from the effluent cuts from Example 10, but in addition from 10 liters of black solution as indicated. The same is true in Example 12 where to the effluent from Example 11, there was added 18 liters of black solution. Thus, this method of treating solutions doe not mean that one solution can be tagged throughout its passage to the several columns, since by the process of this invention, there will be continuous feeding of black solutions to the columns.

In Example 10, effluent cuts 9 to about 15; Example 11, effluent cuts 6 to 16; Example 12, effluent cuts 5 to 17, show the obtainment of solutions containing a very high amount of titanium, a low amount of iron and a factor of acidity which can be readily adjusted for the purpose of hydrolyzing the solutions. As a matter of fact, in Example 12, effluent cuts 5 to 7 represent over 7 liters of effluent product eminently suitable for hydrolysis. It will be noted that throughout this continuous cycling, effluent, suitable for hydrolysis, can be continuously withdrawn from the cycle.

In addition to the above, one of the unique features of this invention resides in the fact that a substantially pure acid solution can be withdrawn from the continuous cycling as demonstrated by effluent cuts 2 and 3—over of almost four thousand for further disposition. As a matter of fact, I have established that in a continuous cycling process as demonstrated above, I can, (1) continuously remove substantially pure sulfuric acid from the cycle for further disposition or use, and (2) continuously remove effluent solutions of a factor of acidity of around 70, of substantially no iron content and a high $TiO_2$ content for hydrolysis. By this continuous cycling method, of course, it is to be understood that solutions of a high free acid content, but containing some impurity, are continuously recycled as well as those solutions of a high $TiO_2$ content but also containing other impurities.

It is known in the art that in order to prepare titanic acid by chemical hydrolysis, factor of acidity is important because any excess acid will require additional purchased alkali for neutralization and the extra salt must be washed out. Also, in thermal hydrolysis by the law of mass action, sulfuric acid is one of the resultant hydrolysis products. It can be readily appreciated that by the process of this invention, solutions are obtained with a low factor of acidity which is conducive to optimum hydrolysis conditions. In contrast to the prior art, this means that with the solutions obtained by the process of my invention, there will be reduced treatment with alkali and reduced cake washing. Moreover, increased capacity can be realized by this process and all of these advances are readily translated into money.

In treating waste acid solutions with a sulfonated-type cation exchange resin in the hydrogen form, it will be realized that one of the advantages of this process is the economic recovery of spent acid and the increased yield of titanium dioxide. Even more important in some instances is the abatement of the pressing pollution problem. The method herein described can be adapted for either small or large-scale acid recovery and manufacture of titanium dioxide.

In a preferred application of my invention, even more advantageous results can be obtained by the contact of a pregnant solution from the sulfuric acid digestion of titanium-bearing ores and slags. The contacted solution of sulfuric acid at once represents a purified solution free from both soluble and insoluble contaminants, and, after the $TiO_2$ precipitation, a filtrate suitable for immediate concentration and use.

I have also noted that by employing cross-linked substantially acid and water-insoluble cation exchange resins of the types indicated above, and specifically the sulfonic acid group type, the resin can be regenerated almost continuously for long periods of time, without showing any appreciable degeneration. Thus, the resin costs in operations of this type will be relatively low.

Having thus described my invention, I hereby claim:

1. A method of separating tetravalent titanium values in an aqueous sulfuric acid feed solution from associated metallic impurities therein, said impurities having valency state below 4, which comprises contacting said feed solution with a water-insoluble cation exchange resin in the hydrogen form, and recovering from the contacting a product solution reduced in said metallic impurities and containing the bulk of said titanium values.

2. The method of claim 1 wherein said feed solution is obtained from reacting sulfuric acid with a titaniferous solid material, and the predominant metallic impurity is iron sulfate.

3. The method of claim 2 wherein the feed solution is a clarified one, and the iron sulfate therein is in the ferrous state.

4. The method of claim 1 wherein the product solution is recovered as a plurality of fractions, and at least the initial fraction recovered consists essentially of aqueous sulfuric acid.

5. The method of claim 1 wherein said feed solution is a waste acid solution obtained from the hydrolysis of titanium sulfate to make a titanium hydrate.

6. The method of claim 1 wherein said cation exchange resin contains sulfonic acid groups.

7. The method of claim 1 wherein cation exchange resin is maintained in a plurality of contacting zones, and the resin in at least one of said zones is being regenerated into the hydrogen form while the resin in the hydrogen form in other of said zones is being contacted with said feed solution.

References Cited in the file of this patent

UNITED STATES PATENTS 2,589,909    Weikel _____ Mar. 18, 1952

OTHER REFERENCES

Kunin et al.: "Ion Exchange in the Atomic Energy Program," Industrial and Engineering Chemistry, vol. 48, No. 8, August 1956, pages 30A–35A.

UNITED STATES PATENT OFFICE

CERTIFICATION OF CORRECTION

Patent No. 3,001,854                      September 26, 1961

Lester A. Kenworthy

It is hereby certified that error appears in the above numbered patent requiring correction and that the said Letters Patent should read as corrected below.

Column 4, line 52, for "solutions" read -- solution --; columns 15 and 16, "EXAMPLE 12", in the table, first column thereof, for "18 liters o black solution" read -- 18 liters black solution --; colums 17 and 18, "EXAMPLE 13", in the table, third column thereof line 9, for "2,400" read -- 2,300 --.

Signed and sealed this 10th day of April 1962.

(SEAL)
Attest:

ERNEST W. SWIDER                      DAVID L. LADD
Attesting Officer                     Commissioner of Patents